United States Patent
Nelapati et al.

(10) Patent No.: US 11,378,652 B2
(45) Date of Patent: Jul. 5, 2022

(54) ENHANCEMENT OF VEHICLE RADAR SYSTEM ROBUSTNESS BASED ON ELEVATION INFORMATION

(71) Applicant: GM Global Technology Operations LLC, Detroit, MI (US)

(72) Inventors: Praneeth Nelapati, Novi, MI (US); Jeffrey A. Clark, Macomb Township, MI (US); Mark R. Hocevar, Southington, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 16/559,127

(22) Filed: Sep. 3, 2019

(65) Prior Publication Data
US 2021/0063533 A1    Mar. 4, 2021

(51) Int. Cl.
| | | |
|---|---|---|
| G01S 7/40 | (2006.01) | |
| G01S 13/93 | (2020.01) | |
| G01S 7/41 | (2006.01) | |
| G01S 19/13 | (2010.01) | |
| G01S 13/931 | (2020.01) | |

(52) U.S. Cl.
CPC .............. *G01S 7/40* (2013.01); *G01S 7/4021* (2013.01); *G01S 7/414* (2013.01); *G01S 13/931* (2013.01); *G01S 19/13* (2013.01)

(58) Field of Classification Search
CPC .......... G01S 7/40; G01S 7/4021; G01S 7/414; G01S 13/931; G01S 19/13; G01S 7/4026; G01S 7/4034; G01S 19/14; G01S 19/42; G01S 19/48; G01S 7/023
See application file for complete search history.

(56) References Cited

U.S. PATENT DOCUMENTS

| | | | | |
|---|---|---|---|---|
| 5,061,932 A | * | 10/1991 | Tribe | B60G 17/019 73/105 |
| 5,315,303 A | * | 5/1994 | Tsou | G01S 13/345 342/27 |
| 5,485,156 A | * | 1/1996 | Manseur | G01S 7/02 342/77 |
| 5,508,706 A | * | 4/1996 | Tsou | G01S 7/032 342/192 |
| 6,304,828 B1 | * | 10/2001 | Swanick | G01S 7/021 702/191 |
| 6,556,166 B1 | * | 4/2003 | Searcy | G01S 7/4026 343/703 |
| 7,336,219 B1 | * | 2/2008 | Lohmeier | G01S 13/931 342/21 |
| 7,522,089 B2 | * | 4/2009 | Radza | G01S 7/415 342/162 |

(Continued)

*Primary Examiner* — Erin F Heard
*Assistant Examiner* — Juliana Cross
(74) *Attorney, Agent, or Firm* — Cantor Colburn LLP (57) ABSTRACT

Systems and methods implemented in a vehicle involve obtaining elevation information and determining a change in elevation of the vehicle. A method includes determining that the change in elevation indicates an increase or a decrease in the elevation of the vehicle. The method also includes adjusting, for a radar system of the vehicle, a range of detection or a detection threshold that defines a minimum reflected energy required to declare a detection based on the determining that the change in elevation indicates the increase or the decrease in the elevation of the vehicle.

20 Claims, 4 Drawing Sheets

(56) References Cited

U.S. PATENT DOCUMENTS

| | | | |
|---|---|---|---|
| 7,808,422 B1* | 10/2010 | Woodell | G01S 13/953 342/26 B |
| 9,424,750 B2* | 8/2016 | Hayashi | G01S 13/06 |
| 11,163,053 B2* | 11/2021 | Shayovitz | G01S 13/5248 |
| 2008/0042894 A1* | 2/2008 | Kikuchi | G01S 7/411 342/70 |
| 2008/0191930 A1* | 8/2008 | Banaszak | G01S 13/931 342/93 |
| 2010/0253573 A1* | 10/2010 | Holzheimer | G01S 7/40 342/176 |
| 2013/0332064 A1* | 12/2013 | Funk | G01C 21/165 701/409 |
| 2014/0225764 A1* | 8/2014 | Jarvis | G01S 7/022 342/118 |
| 2014/0240169 A1* | 8/2014 | Lee | G01S 7/292 342/159 |
| 2016/0124084 A1* | 5/2016 | Lim | G01S 7/354 342/160 |
| 2017/0059703 A1* | 3/2017 | Hoare | G01S 13/89 |
| 2017/0205506 A1* | 7/2017 | Voorheis | G01S 13/66 |
| 2017/0371028 A1* | 12/2017 | Laifenfeld | G01S 13/865 |
| 2018/0224855 A1* | 8/2018 | Eickhoff | G01C 11/02 |
| 2018/0275259 A1* | 9/2018 | Ott | G01S 13/5246 |
| 2018/0328742 A1* | 11/2018 | Asai | G01C 21/14 |
| 2019/0072667 A1* | 3/2019 | Duque Biarge | G01S 13/4454 |
| 2019/0080608 A1* | 3/2019 | Lee | G01S 19/42 |
| 2019/0173196 A1* | 6/2019 | Achour | G01S 13/426 |
| 2019/0277640 A1* | 9/2019 | Nelapati | G01C 21/32 |
| 2019/0361114 A1* | 11/2019 | Kim | H01Q 3/34 |
| 2020/0057137 A1* | 2/2020 | Solodky | G01S 13/931 |
| 2020/0072941 A1* | 3/2020 | Jansen | G01S 13/42 |
| 2020/0072958 A1* | 3/2020 | Santra | H01L 23/66 |
| 2020/0150224 A1* | 5/2020 | Cejka | G01S 7/4034 |
| 2020/0408897 A1* | 12/2020 | Westerhoff | G01S 7/415 |
| 2021/0134162 A1* | 5/2021 | Sundaramurthy | G01S 19/26 |
| 2021/0199758 A1* | 7/2021 | Izadian | G01S 7/4026 |

* cited by examiner

ENHANCEMENT OF VEHICLE RADAR SYSTEM ROBUSTNESS BASED ON ELEVATION INFORMATION

INTRODUCTION

The subject disclosure relates to the enhancement of vehicle radar system robustness based on elevation information.

Vehicles (e.g., automobiles, trucks, construction equipment, farm equipment, automated factory equipment) are increasingly equipped with sensors to provide information about the vehicle and its environment. The information from the sensors facilitates semi-autonomous operation (e.g., collision avoidance, collision-imminent braking, adaptive cruise control) as well as autonomous operation. Exemplary sensors include cameras, lidar systems, and radar systems. Many sensors (e.g., radar systems) have a field of view (FOV) and provide information based on data obtained within that FOV. When the FOV is affected by factors that are unknown or unaccounted for, inaccurate information may be gleaned from such sensors. Accordingly, it is desirable to provide enhancement of vehicle radar system robustness based on elevation information.

SUMMARY

In one exemplary embodiment, a method implemented in a vehicle includes obtaining elevation information and determining a change in elevation of the vehicle. The method also includes determining that the change in elevation indicates an increase or a decrease in the elevation of the vehicle. A range of detection or a detection threshold that defines a minimum criteria required to declare a detection for a radar system of the vehicle is adjusted based on the determining that the change in elevation indicates the increase or the decrease in the elevation of the vehicle.

In addition to one or more of the features described herein, the method also includes increasing a weight given to a clutter detection module that tracks an energy level of detected clutter by the radar system based on the determining that the change in elevation indicates the decrease in the elevation of the vehicle.

In addition to one or more of the features described herein, the method also includes determining, as a clutter range, a range at which the level of detected clutter increases more than a threshold amount or increases above a threshold value.

In addition to one or more of the features described herein, the adjusting includes decreasing the range of detection of the radar system.

In addition to one or more of the features described herein, the adjusting additionally includes increasing the detection threshold.

In addition to one or more of the features described herein, the method also includes confirming that the detected clutter increases more than the threshold amount or increases above the threshold value across all azimuth angles at the clutter range.

In addition to one or more of the features described herein, the method also includes increasing a weight given to a clutter detection module that tracks an energy level of detected clutter by the radar system based on the determining that the change in elevation indicates the decrease in the elevation of the vehicle.

In addition to one or more of the features described herein, the method also includes determining, as a target detection level, an energy level reflected by the other vehicle in front of the vehicle.

In addition to one or more of the features described herein, the adjusting includes increasing the detection threshold to be at or above the target detection level and additionally includes decreasing the range of detection of the radar system.

In addition to one or more of the features described herein, the method also includes confirming that the target detection level is consistent across all azimuth angles.

In another exemplary embodiment, a system in a vehicle includes a global navigation satellite system to provide the elevation of the vehicle. The system also includes a processor to obtain the elevation of the vehicle and determine that a change in elevation of the vehicle indicates an increase or a decrease in the elevation of the vehicle, and to adjust, for a radar system of the vehicle, a range of detection or a detection threshold that defines a minimum criteria required to declare a detection based on the change in elevation being the increase or the decrease in the elevation of the vehicle.

In addition to one or more of the features described herein, the processor increases a weight given to a clutter detection module that tracks an energy level of detected clutter by the radar system based on determining that the change in elevation indicates the decrease in the elevation of the vehicle.

In addition to one or more of the features described herein, the processor determines, as a clutter range, a range at which the level of detected clutter increases more than a threshold amount or increases above a threshold value.

In addition to one or more of the features described herein, the processor decreases the range of detection of the radar system to be less than the clutter range.

In addition to one or more of the features described herein, the processor increases the detection threshold.

In addition to one or more of the features described herein, the processor confirms that the detected clutter increases more than the threshold amount or increases above the threshold value across all azimuth angles at the clutter range.

In addition to one or more of the features described herein, the processor increases a weight given to a target elevation tracking module that tracks an elevation of another vehicle in front of the vehicle by the radar system based on determining that the change in elevation indicates the increase in the elevation of the vehicle.

In addition to one or more of the features described herein, the processor determines, as a target detection level, an energy level reflected by the other vehicle in front of the vehicle.

In addition to one or more of the features described herein, the processor increases the detection threshold to be at or above the target detection level and additionally to decrease the range of detection of the radar system.

In addition to one or more of the features described herein, the processor confirms that the target detection level is consistent across all azimuth angles.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, when the FOV of a sensor is affected by factors that are unknown or unaccounted for, inaccurate information may be gleaned from such sensors. When sensors are in a vehicle, one of the factors that may affect FOV, as well as ground clutter, noise, and the radar signature of objects, is elevation. As one example, when the elevation of the road that the vehicle is traversing increases and then levels off or decreases, the FOV of the radar system includes an area in which the road is no longer visible (i.e., at the point at which the elevation changes). As such, another vehicle that is in front and passes that area will seem to have become less significant or have disappeared. Correspondingly, when the elevation of the road that the vehicle is traversing levels off in front of the descending vehicle or increases in front of the level vehicle, the FOV of the radar system includes an area in which the road appears in front of (i.e., as a barrier) to the vehicle. That is, ground returns become more significant than reflections from the other vehicle. As such, reflections from the ground or road surface may appear as a stationary obstacle. Embodiments of the systems and methods detailed herein relate to the enhancement of vehicle radar system robustness based on elevation information. Specifically, by recognizing the elevation changes in the road based on the elevation information, the radar system is made more robust, because a change in FOV of the radar system is not misconstrued and does not result in inaccurate detection, as detailed.

Figure 1:
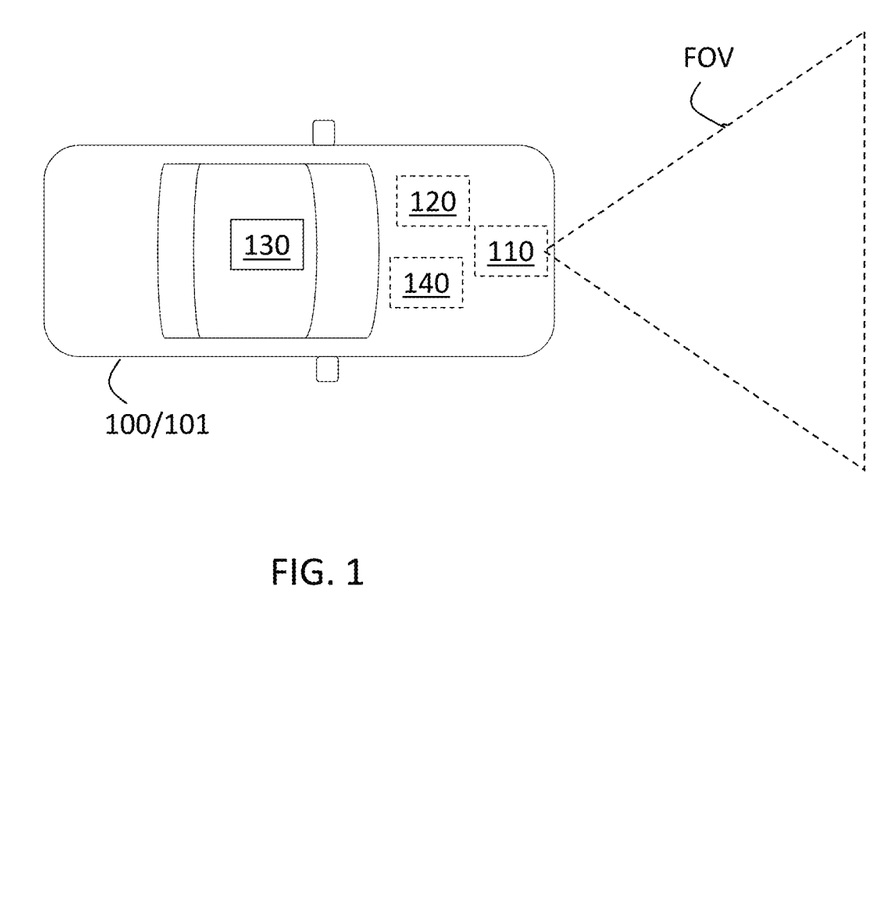
FIG. 1 is a block diagram of an exemplary vehicle that implements enhancement of vehicle radar system robustness based on elevation information according to one or more embodiments.

In accordance with an exemplary embodiment, FIG. 1 is a block diagram of an exemplary vehicle 100 that implements enhancement of vehicle radar system robustness based on elevation information. The exemplary vehicle 100 shown in FIG. 1 is an automobile 101. The vehicle 100 includes a radar system 110 with a FOV, as indicated. The vehicle 100 also includes a global navigation satellite system (GNSS) 120 such as a global positioning system (GPS) or precise positioning system (PPS), for example. The vehicle 100 may additionally include other sensors 130 (e.g., lidar system, camera). These sensors may be located anywhere within or on the vehicle 100 according to alternate embodiments.

A controller 140 obtains information from the radar system 110, GNSS 120, and other sensors 130 and controls aspects of the operation of the vehicle 100. Aspects of the functionality discussed for the controller 140 may be implemented within the radar system 110 or sensors 130. In general, the combinations of elements that are used to perform the functionality discussed with reference to FIG. 3, for example, is not limited. The controller 140 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
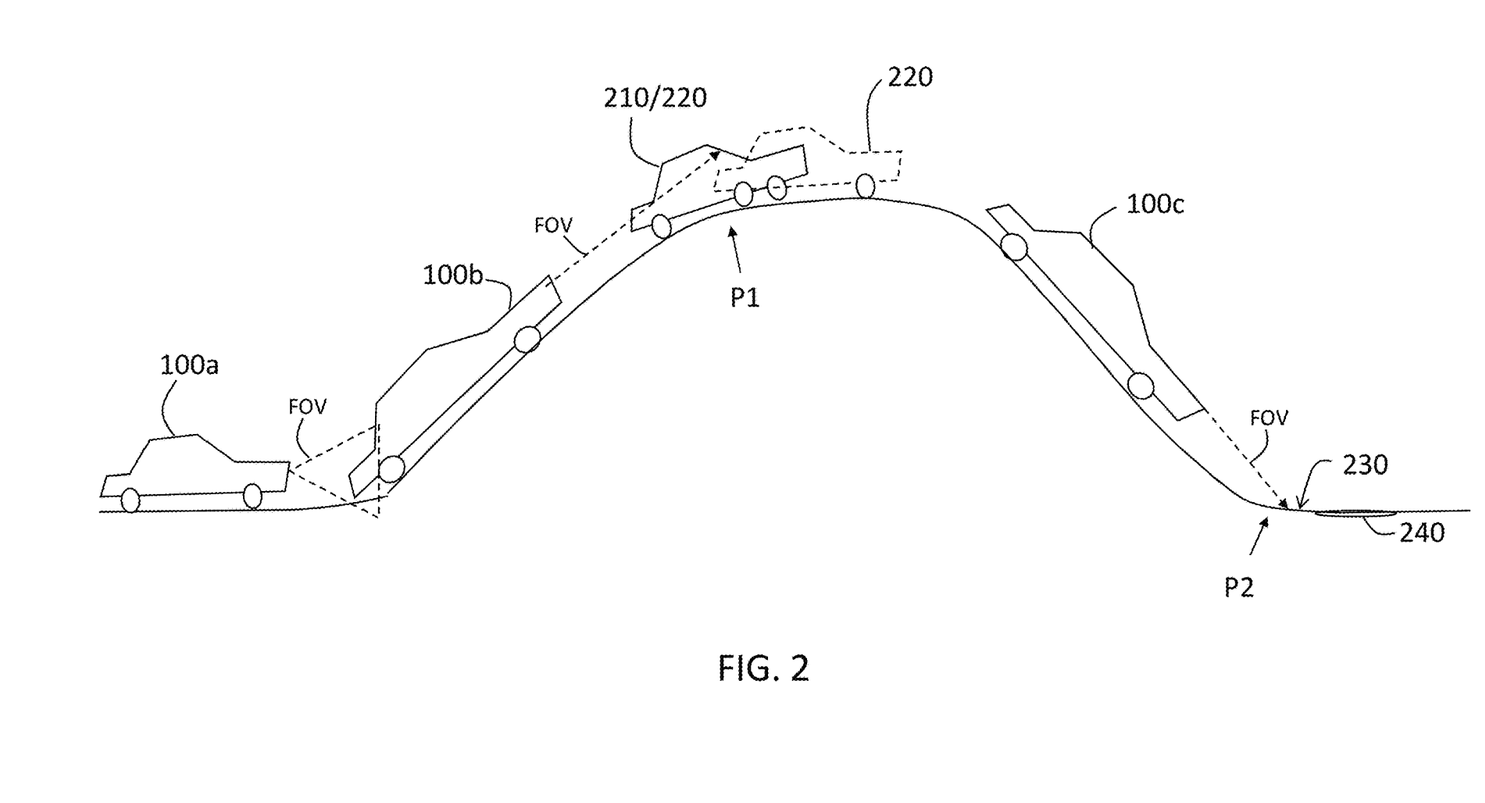
FIG. 2 illustrates three exemplary scenarios in which vehicle radar system robustness is enhanced based on elevation information according to one or more embodiments.

FIG. 2 illustrates three exemplary scenarios in which vehicle radar system robustness is enhanced based on elevation information according to one or more embodiments. Three vehicles 100a, 100b, and 100c (generally referred to as 100) are shown in different situations. The vehicle 100a is on a flat surface that is approaching an elevation (i.e., the road goes uphill in front of the vehicle 100a). Compared to the scenario when both vehicle 100a and vehicle 100b are on the flat portion, vehicle 100b, which is in front of the vehicle 100a, would reflect a different energy pattern when the vehicle 100b is on the uphill portion while the vehicle 100a is still on the flat portion, as shown. That is, the vehicle 100b would be in a different part of the FOV of the radar system 110 (e.g., more of the FOV) of the vehicle 100a along elevation angles. In this situation, adjusting the detection threshold according to one or more embodiments, as further detailed with reference to FIGS. 3 and 4, may increase the robustness of the radar system 110 of the vehicle 100a. Detection threshold refers to a level that must be reached by a set of parameters or observers based on processed reflections received by the radar system 110 in order for a detection (of another vehicle 100 or other relevant object rather than clutter) to be declared.

The vehicle 100b is experiencing an increase in elevation while the vehicle 100c is experiencing a decrease in elevation. The dashed line indicates the direction in which the radar system 110 FOV is focused for each vehicle 100b, 100c. The vehicle 100b is following another vehicle 210, referred to as a target object 220 of the radar system 110 of the vehicle 100b. Two different positions of the target object 220 are shown in FIG. 2. The target object 220 is shown as a dashed object in its second position. The target object 220 is in the FOV of the radar system 110 (FIG. 1) of the vehicle 100b at the first (solid) position of the target object 220 shown in FIG. 2. However, as the vehicle 100b approaches a place at which the point P1 is within the FOV of the radar system 110 of the vehicle 100b but the target object 220 is beyond that point P1, the target object 220 will (unexpectedly) decrease its presence in the FOV of the radar system 110 of the vehicle 100b and eventually disappear from the FOV. This scenario is indicated by the second (dashed) position of the target object 220 shown in FIG. 2. Essentially, the target object 220 will seem to have disappeared. In this situation, adjusting the radar range beyond which data is considered unreliable, as further detailed with reference to FIGS. 3 and 4, may increase the robustness of the radar system 110 of the vehicle 100b.

As previously noted, the vehicle 100c is experiencing a decrease in elevation. As the vehicle 100c passes a place at which the point P2 is within the FOV of the radar system 110 (FIG. 1) of the vehicle 100c, the flat road surface 230 will be in the FOV of the radar system 110 of the vehicle 100c. The road surface 230 itself will dramatically increase the reflections received by the radar system 110 of the vehicle 100c. In addition, any reflective object 240 (e.g., manhole cover) on the road surface 230 will increase the reflected energy even more. These reflections will appear as an obstruction or road clutter that is in front of the vehicle 100c due to the relative arrangement of the vehicle 100*c* and the road surface 230. In this situation, as in the situation discussed for vehicle 100*a*, adjusting the detection threshold according to one or more embodiments, as further detailed with reference to FIGS. 3 and 4, may increase the robustness of the radar system 110 of the vehicle 100*c*.

While three exemplary scenarios are illustrated in FIG. 2, other scenarios involving changes in elevation can also affect the accuracy of the information obtained with the radar system 110. For example, another exemplary scenario is a vehicle 100 on a flat surface that is approaching an elevation (i.e., the road goes uphill in front of the vehicle 100 as for vehicle 100*a* in FIG. 2). Railroad tracks, a sewer grate, or any other reflective object 240 on the incline may appear as an obstruction (i.e., a sharp increase in road clutter) to the vehicle 100. In each of the above-noted scenarios and many others, elevation information enhances the robustness of the radar system 110 by facilitating proper adjustment of the detection range and detection threshold, as detailed with reference to FIGS. 3 and 4.

Figure 3:
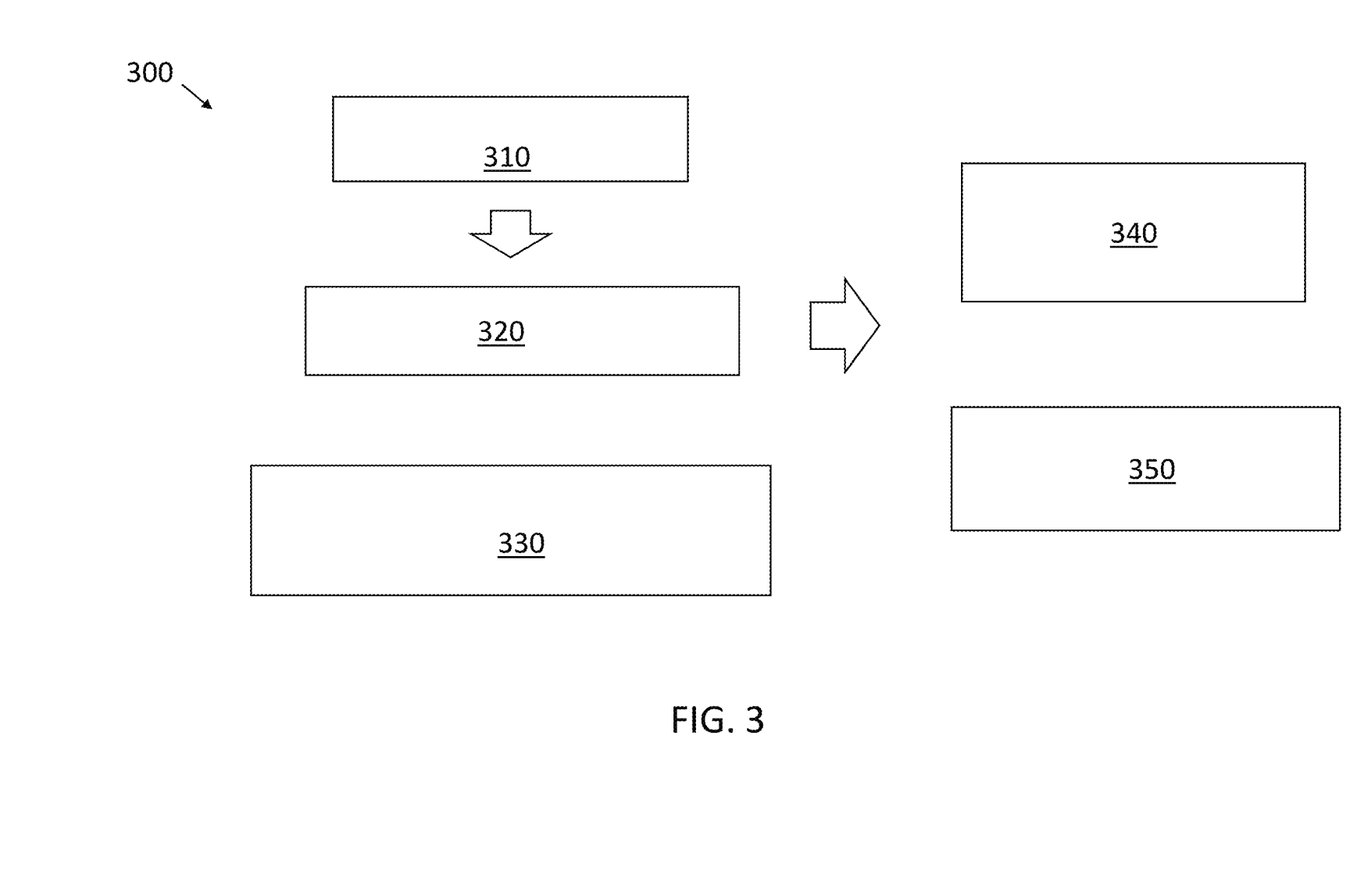
FIG. 3 is a block diagram of processing modules that process data from the radar system and enhance robustness based on elevation information according to one or more embodiments.

FIG. 3 is a block diagram of processing modules 300 that process data from the radar system 110 and enhance robustness based on elevation information according to one or more embodiments. The processing modules 300 discussed may be implemented within the radar system 110, by the controller 140, or by a combination of the two. An elevation tracking module 310 is added to conventional processes to accomplish the robustness according to one or more embodiments. The elevation tracking module 310 obtains elevation information from the GNSS 120 and acts as a trigger to changing the weight that is given to other processing modules 300 in FIG. 3. The GNSS 120 may provide elevation information periodically (e.g., at a 1 hertz (Hz) frequency). As further discussed with reference to FIG. 4, information from the elevation tracking module 310 is used to determine a change in elevation. Using elevation change facilitates immunity from accuracy errors in the elevation estimate provided by the GNSS 120. That is, even if the elevation indicated by the GNSS 120 is inaccurate, the next elevation indicated (e.g., one second later) is unlikely to have a different inaccuracy. As a result, the difference between the two elevation indications (i.e., indication of elevation change) is likely be accurate. Thus, by using elevation change, susceptibility to inaccuracy in the GNSS 120 output is mitigated.

A road clutter behavior module 320 indicates the sudden and sharp increase in the indication of clutter as would occur for vehicle 100*a* or 100*c*, as discussed with reference to FIG. 2. By giving the information from this module more weight in certain elevation change scenarios, erroneous information from the radar system 110 can be mitigated, as further discussed with reference to FIG. 4. A target object elevation tracking module 330 tracks the elevation of a target object 220 (FIG. 2) such as another vehicle 210 in front of the vehicle 100 (or vehicle 100*b* in front of vehicle 100*a* in FIG. 2). By giving the information from this module more weight in certain elevation change scenarios, erroneous information from the radar system 110 can be mitigated, as further discussed with reference to FIG. 4.

According to one or more embodiments, the elevation tracking module 310 can trigger the change in weight for information from the road clutter behavior module 320 or the target object elevation tracking module 330 or both based on the elevation information it obtains from the GNSS 120. Information from the road clutter behavior module 320 and the target object elevation tracking module 330, with the weight adjusted based on the elevation tracking module 310, is then used to mitigate the effects of elevation change. The mitigation, which increases the robustness of the radar system 110, is accomplished with a radar range adjustment module 340 and a detection threshold adjustment module 350.

The radar range adjustment module 340 adjusts the range beyond which data from the radar system 110 is deemed untrustworthy. Thus, in the exemplary case of the vehicle 100*c*, shown in FIG. 2, data from the range beyond which the road surface 230 appears to be level with the vehicle 100*b* may be ignored. This may also be the case for vehicle 100*a*. The data beyond the range at which the uphill portion is visible may be ignored while the vehicle 100*a* is some distance away from the uphill portion. Similarly, in the case of the vehicle 100*b*, data from the range beyond which the road surface is no longer visible (point P1), may be ignored.

The detection threshold adjustment module 350 adjusts the energy level that processed data from the radar system 110 must reach in order to be deemed as a true detection rather than a false alarm. In the scenario shown in FIG. 2, as the vehicle 100*a* approaches the uphill portion, the vehicle 100*b*, which goes uphill first, would provide a change (e.g., an increase) in detected energy (i.e., reflected energy) as the relative elevation of the vehicle 100*b* changes (e.g., increases) during its uphill climb. In this exemplary case, based on the target object elevation tracking module 330, the detection threshold would be adjusted (i.e., decreased) by the detection threshold adjustment module 350 to account for the effect of the elevation change. For example, saturation based on the increase in reflected energy may be avoided. The detection threshold adjustment module 350 may be used to adjust the detection threshold in the case of vehicles 100*b* and 100*c*, as well.

Figure 4:
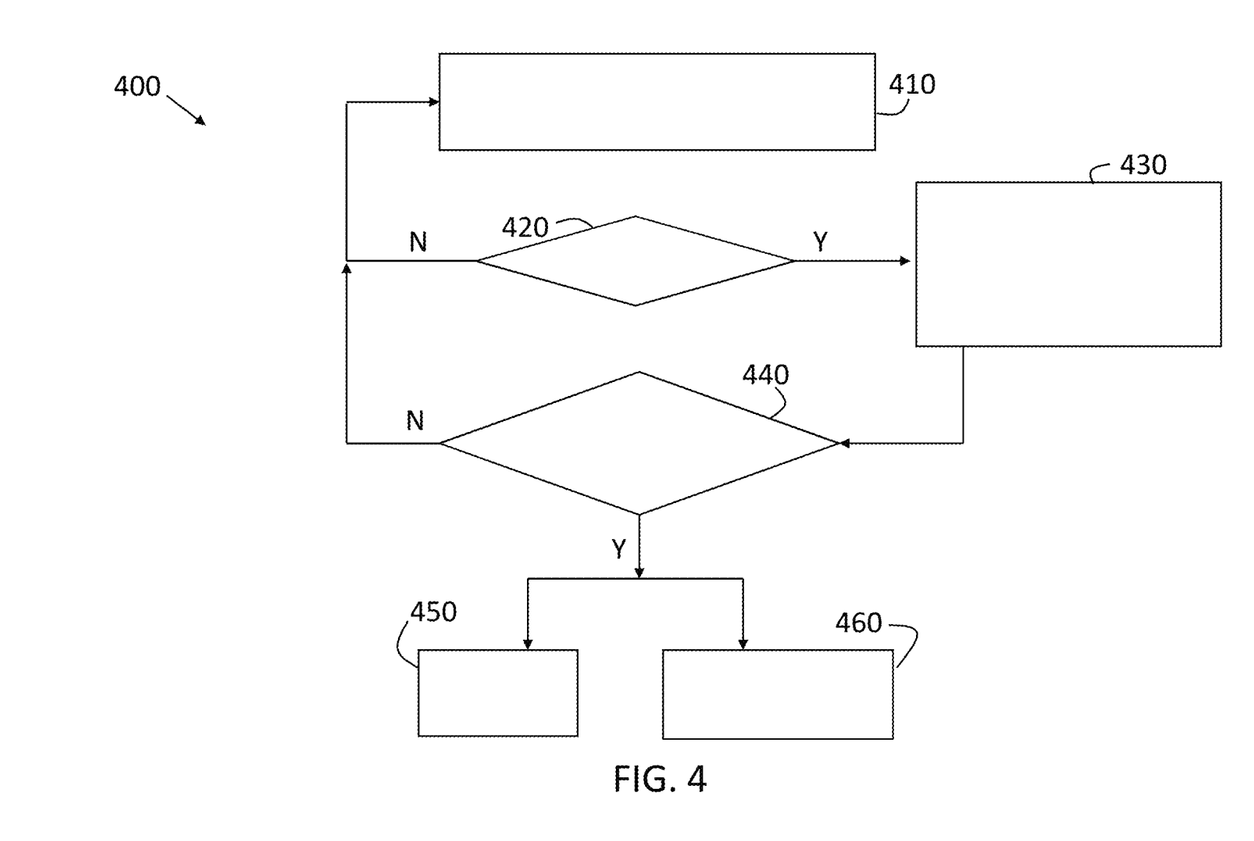
FIG. 4 is a process flow of a method of enhancing robustness of the radar system based on elevation information according to one or more embodiments.

FIG. 4 is a process flow of a method 400 of enhancing robustness of the radar system 110 based on elevation information according to one or more embodiments. At block 410, obtaining elevation information and determining elevation change refers to the elevation tracking module 310 obtaining elevation information from the GNSS 120 and determining the change from the last iteration. As previously noted, the GNSS 120 may provide elevation information periodically (e.g., at a 1 Hz rate). A check is done, at block 420, of whether there is an elevation change. If not, the next iteration of obtaining elevation information, at block 410, is performed.

If, based on the check at block 420, there is a change in elevation, the process at block 430 is performed. At block 430, increasing weight based on elevation increase or decrease refers to the fact that, when the elevation change indicates an increase, the weight of information from the target object elevation tracking module 330 is increased, and when the elevation change indicates a decrease, the weight of information from the road clutter behavior module 320 is increased. Increasing the weight given to one of the processing modules 300 refers to the fact that information from the higher-weight processing module 300 may lead to an action that is contradicted or undercut by another lower-weight processing module 300. For example, when the road clutter behavior module 320 is given higher weight than the target object elevation tracking module 330 (e.g., due to the vehicle 100 experiencing a decrease in elevation), then with or without the presence of a target object 220, the radar system 110 may be controlled according to the range at which the road clutter is seen to increase by an amount that exceeds a threshold increase value or at which the road clutter reflected energy exceeds a threshold energy value.

As another example, when the target object elevation tracking module 330 is given higher weight than the road clutter behavior module 320 (e.g., due to the vehicle 100 experiencing an increase in elevation), then with or without the presence of a change in detected clutter, the radar system 110 may be controlled according to the perceived increase in elevation of the target object 220. As previously noted, the target object 220 will provide returns from a wider range of elevation angles in the scenario shown for vehicle 100a (FIG. 2) with the target object being vehicle 100b, for example. This will result in an increase in reflected energy from the target object 220 by an amount that exceeds a threshold increase value or a threshold energy value.

At block 440, a check is done of whether the behavior is consistent over the FOV. Specifically, this refers to determining if a behavior is consistent throughout the azimuthal FOV. For example, if the elevation change indicates a decrease (i.e., vehicle 100 is going downhill) and, at block 430, the weight of the road clutter behavior module 320 is increased, the check indicates if the clutter behavior is over the entire azimuth FOV. This will confirm whether an object (clutter) appeared or if it likely to be the road surface. If the elevation change indicates an increase (i.e., vehicle 100 is going uphill) and, at block 430, the weight of the target object elevation tracking module 330 is increased, the check indicates if the target object elevation behavior is over the entire azimuthal FOV. This will confirm whether the object (other vehicle 210) is going up in elevation. Generally, the check at block 440 is used to confirm that changes in road elevation are, in fact, responsible for the clutter behavior or target object elevation behavior being observed.

If the check at block 440 indicates that the behavior is not consistent over the azimuthal FOV, then the next iteration of obtaining elevation information, at block 410, is performed. If the check at block 440 indicates that the behavior is consistent over the FOV, then adjusting range, at block 450, with the radar range adjustment module 340, adjusting detection threshold, at block 460, with the detection threshold adjustment module 350, or both may be performed. The adjustment may be preset or may be dependent on the indication provided by the road clutter behavior module 320 and the target object elevation tracking module 330. That is, the range may be reduced from the maximum detectable range by a pre-specified amount and the detection threshold may be increased by a pre-specified amount according to an exemplary embodiment.

According to an alternate amount, the range at which the increase in clutter was detected may be used to set the range beyond which data is ignored. Similarly, the amplitude of reflections from the road surface 230 or from a reflective object 240 may be used to set the detection threshold (i.e., the detection threshold is set as a value greater than the amplitude of the reflections from the road surface 230 or reflective object 240). A combination of approaches may also be used. For example, the range at which a marked increase in clutter was detected may be used to set the range beyond which data is ignored. In addition, the detection threshold may be increased by a pre-specified amount. In this case, as the vehicle 100 moves such that the clutter is within the set range, the clutter is less likely to result in a false detection.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method implemented in a vehicle, comprising:
obtaining, using a processor, elevation information and determining a change in elevation of the vehicle;
determining, using the processor, that the change in elevation indicates an increase or a decrease in the elevation of the vehicle; and
adjusting, by the processor, based on the determining that the change in elevation indicates the increase or the decrease in the elevation of the vehicle and as part of a processing of reflections received by a radar system of the vehicle, a range of detection or a detection threshold that defines a minimum criteria required to declare a detection, each of the range of detection and the detection threshold being a parameter used in the processing of the reflections received by the radar system.

2. The method according to claim 1, further comprising increasing a weight given to a clutter detection module that tracks an energy level of detected clutter by the radar system based on the determining that the change in elevation indicates the decrease in the elevation of the vehicle.

3. The method according to claim 2, further comprising determining, as a clutter range, a range at which the level of detected clutter increases more than a threshold amount or increases above a threshold value.

4. The method according to claim 3, wherein the adjusting includes decreasing the range of detection of the radar system.

5. The method according to claim 4, wherein the adjusting additionally includes increasing the detection threshold.

6. The method according to claim 3, further comprising confirming that the detected clutter increases more than the threshold amount or increases above the threshold value across all azimuth angles at the clutter range.

7. The method according to claim 1, further comprising increasing a weight given to a clutter detection module that tracks an energy level of detected clutter by the radar system based on the determining that the change in elevation indicates the increased in the elevation of the vehicle.

8. The method according to claim 7, further comprising determining, as a target detection level, an energy level reflected by the other vehicle in front of the vehicle.

9. The method according to claim 8, wherein the adjusting includes increasing the detection threshold to be at or above the target detection level and additionally includes decreasing the range of detection of the radar system.

10. The method according to claim 8, further comprising confirming that the target detection level is consistent across all azimuth angles.

11. A system in a vehicle, the system comprising:
a global navigation satellite system configured to provide the elevation of the vehicle; and
a processor configured to obtain the elevation of the vehicle and determine that a change in elevation of the vehicle indicates an increase or a decrease in the elevation of the vehicle, and to adjust, based on the change in elevation being the increase or the decrease in the elevation of the vehicle and as part of a processing of reflections received by a radar system of the vehicle, a range of detection or a detection threshold that defines a minimum criteria required to declare a detection, each of the range of detection and the detection threshold being a parameter used in the processing of the reflections received by the radar system based.

12. The system according to claim 11, wherein the processor is configured to increase a weight given to a clutter detection module that tracks an energy level of detected clutter by the radar system based on determining that the change in elevation indicates the decrease in the elevation of the vehicle.

13. The system according to claim 12, wherein the processor is further configured to determine, as a clutter range, a range at which the level of detected clutter increases more than a threshold amount or increases above a threshold value.

14. The system according to claim 13, wherein the processor is configured to decrease the range of detection of the radar system to be less than the clutter range.

15. The system according to claim 14, wherein the processor is additionally configured to increase the detection threshold.

16. The system according to claim 13, wherein the processor is further configured to confirm that the detected clutter increases more than the threshold amount or increases above the threshold value across all azimuth angles at the clutter range.

17. The system according to claim 11, wherein the processor is configured to increase a weight given to a target elevation tracking module that tracks an elevation of another vehicle in front of the vehicle by the radar system based on determining that the change in elevation indicates the increase in the elevation of the vehicle.

18. The system according to claim 17, wherein the processor is configured to determine, as a target detection level, an energy level reflected by the other vehicle in front of the vehicle.

19. The system according to claim 18, wherein the processor is configured to increase the detection threshold to be at or above the target detection level and additionally to decrease the range of detection of the radar system.

20. The system according to claim 18, wherein the processor is further configured to confirm that the target detection level is consistent across all azimuth angles.

* * * * *